United States Patent [19]

Olsson

[11] 4,165,115

[45] Aug. 21, 1979

[54] JAR HOLDER

[75] Inventor: Rune J. Olsson, Höllviksnäs, Sweden

[73] Assignee: Produnik AB, Malmo, Sweden

[21] Appl. No.: 858,150

[22] Filed: Dec. 7, 1977

[30] Foreign Application Priority Data

Oct. 12, 1977 [SE] Sweden .............................. 7711455

[51] Int. Cl.² .............................................. A47J 45/10
[52] U.S. Cl. ................................ 294/27 R; 16/114 R; 294/33
[58] Field of Search ................. 294/2, 3, 27 R, 27 H, 294/28, 31 R, 33, 92, 99 R; 215/100 A; 220/94 R, 96; 16/114 R, 114 A

[56] References Cited

U.S. PATENT DOCUMENTS

| 1,350,641 | 8/1920 | Carlson | 294/33 |
| 1,437,171 | 11/1922 | Currey | 294/27 R |
| 2,029,429 | 2/1936 | Koons | 294/31 R |
| 2,096,263 | 10/1937 | Ruhlman | 294/33 |
| 2,784,996 | 3/1957 | Schaefer | 294/27 R |

FOREIGN PATENT DOCUMENTS

| 216103 | 11/1909 | Fed. Rep. of Germany | 294/27 R |
| 851254 | 10/1960 | United Kingdom | 294/27 R |

Primary Examiner—Johnny D. Cherry

[57] ABSTRACT

A jar holder for handling jars having an external thread for a screw cap comprises a handle with two projecting resilient branches diverging towards the free ends thereof. Each of the branches forms a notch for receiving the edge portion at the opening of the jar and has a serrated edge for engagement with the external thread of the jar.

7 Claims, 4 Drawing Figures

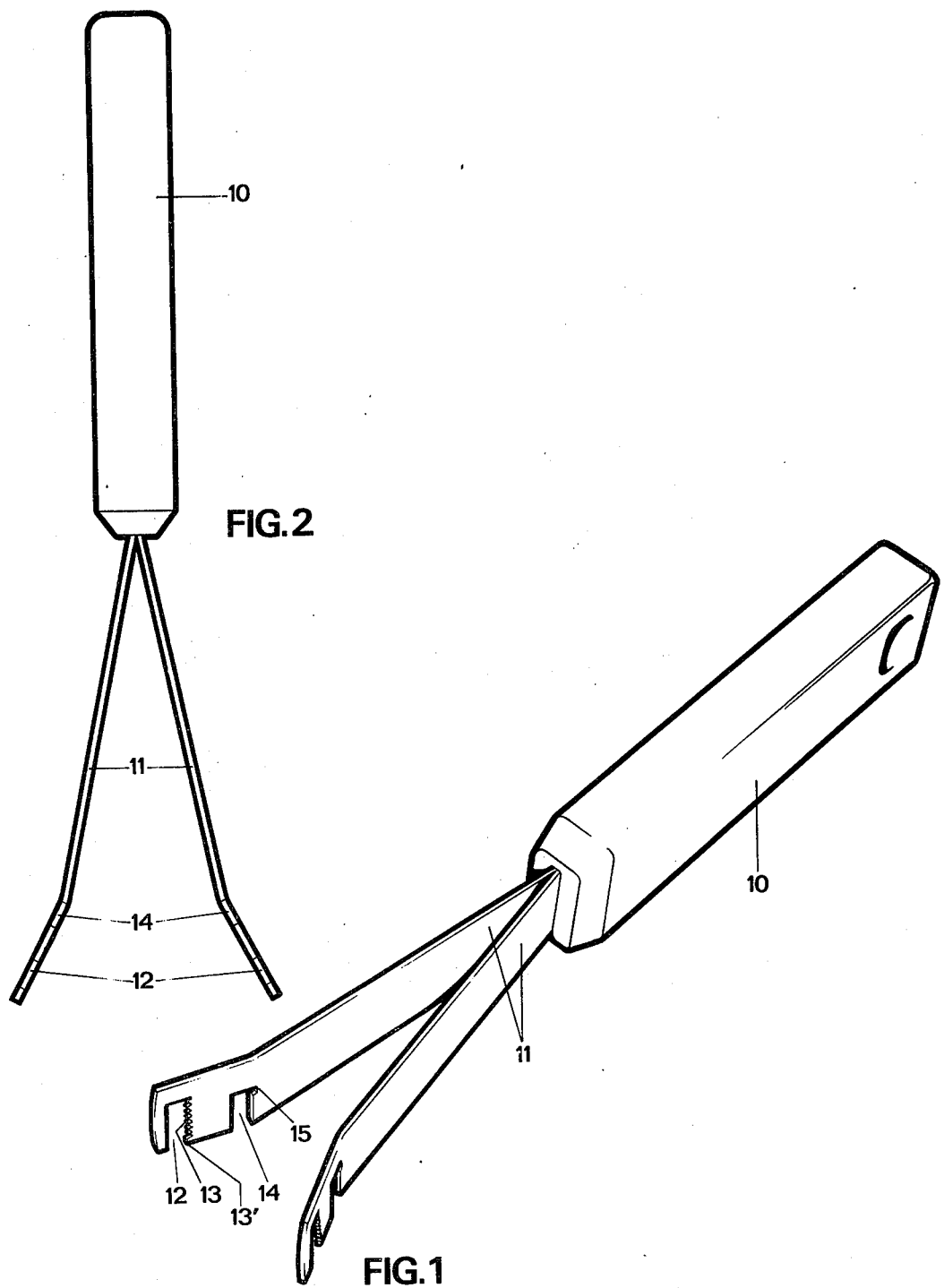

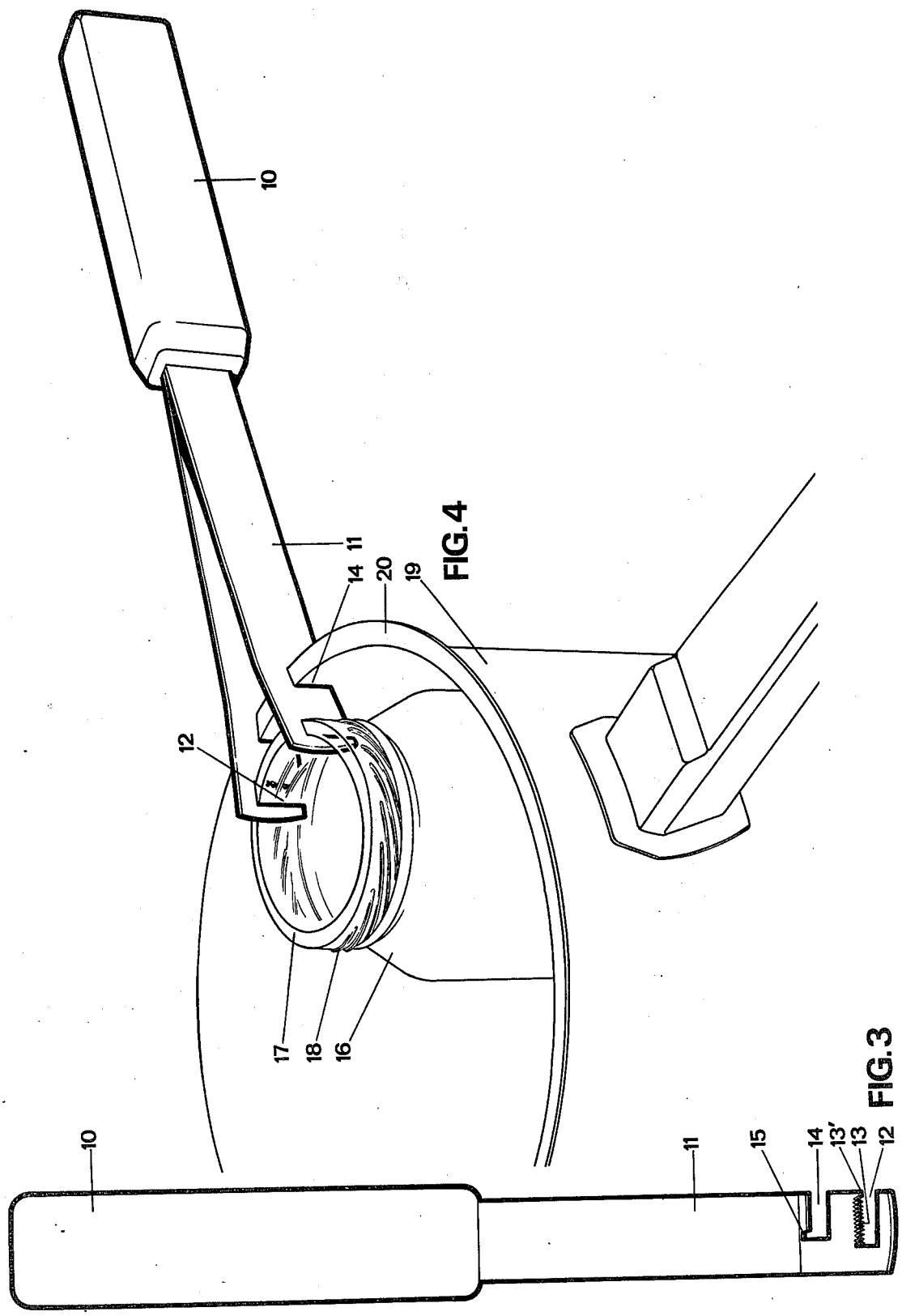

JAR HOLDER

This invention relates to a jar holder for handling jars having an external thread for a screw cap.

In nowadays households there is used to a great extent ready-made food, such as baby-food or "food for one", which is packed and distributed in minor glass jars each containing substantially one serving. Characteristic of these packages is that the contents thereof are so small that it is not worth-while to pour into a casserole for heating. On the contrary, the jar and the contents thereof are heated in a pan with water (waterbath). Everybody who has practiced this procedure knows, however, that it can be rather problematic to stir in the jar during heating and above all to take up the hot jar and to hold it when spooning or pouring out the contents thereof.

It is a primary object of this invention to provide a new and improved simple facility for handling jars of the kind referred to above during heating, stirring and emptying.

It is a further object of this invention to provide a new and improved facility for handling jars of the kind referred to which co-operates with the screw thread of the jar for securely engaging the jar in order to completely avoid the risk of the jar slipping off the holder when the jar is being lifted or when the contents thereof are being stirred in the jar or are being spooned or poured from the jar.

Additional objects and advantages of the invention in part will be set forth in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the jar holder for handling jars having an external thread for a screw cap of this invention comprises a handle, means carried by the handle and forming oppositely spaced notches for receiving the edge portion at the opening of the jar at circumferentially spaced locations thereon, a serration formed along one edge of each notch for engagement with the external thread of the jar, and means resiliently resisting compression of said means to move said notches towards each other.

The accompanying drawings, which are incorporated in and constitute a part of this specification, illustrate embodiments of the invention and, together with the description, serve to explain the principles of the invention.

Of the drawings:

FIG. 1 is a perspective view of the jar holder according to the teachings of the invention;

FIG. 2 is a plan view from below of the jar holder;

FIG. 3 is a side view of the jar holder; and

FIG. 4 is a perspective view illustrating how the jar holder is being used.

Reference will now be made in detail to the present preferred embodiments of the invention, examples of which are illustrated in the accompanying drawings.

The jar holder shown in the drawings comprises a handle 10 of a suitable material such as wood or plastics material. The handle should have such a form that it is comfortable to grip and to hold by hand. In the handle there are fixedly mounted two branches 11 of resilient steel, preferably stainless steel, at one end thereof, which diverge towards the free ends and have the end portions thereof angled outwardly in relation to the rest of the branch. In each branch there is formed near the outer end thereof in the lower edge of the branch a rectangular notch 12 the inner side edge of which is serrated at 13. Inwardly of the notch 12 there is provided a further notch also having rectangular form which is indicated at 14, and at the corner between the inner side edge and the bottom thereof the notch 14 has an indentation 15. The two branches can easily be gripped between the thumb and the forefinger to be pressed towards each other against the spring bias offered by the resiliency thereof, when the jar holder is being held by hand at the handle.

In the preferred embodiment the notch 12 is deeper than the notch 14 and preferably has a depth of about 11 mm. The serrated edge preferably forms an angle to the bottom of the notch, which is slightly larger than 90° while the opposite edge is substantially perpendicular to the bottom. The width at the bottom of the notch 12 can be about 5 mm while the width at the mouth thereof is about 6 mm. In order to secure a firm grip on the jar there is preferably formed an enlarged tooth 13' at the mouth end of the serration 13.

In FIG. 4 there is illustrated how the jar holder is being used. A jar 16 having a neck 17 which is provided with an external thread 18 for a screw cap, is gripped by means of the jar holder by pressing the branches 11 towards each other against the inherent spring bias thereof, the notches 12 then being engaged over the neck of the jar. When the branches then are allowed to spring back the serrations 13 engage the thread 18 and thus the jar is held in a firm grip by the branches without any risk of the jar sliding out of the notches 12 or rotating therein. This is effectively prevented by the engagement between the serrations 13 and the thread 18. Then, the jar can be suspended in a waterbath in a pan 19 as is shown in FIG. 4, the edge portion of the pan being received by the other two notches 14 formed by the branches 11. If the pan has an outwardly flared edge 20 as many nowadays pans have, or has an outwardly folded edge which is also common, this edge will hold, by engagement with the indentation 15 of the notch 14, the jar holder in the position shown wherein the jar 16 can be suspended in the pan 19 from the wall thereof without touching the bottom of the pan. Thereby it is avoided that the jar stands wobbling in the pan during the heating. In other cases the jar can be held manually by means of the jar holder during the heating. The jar can also, of course, be allowed to stand on the bottom of the pan if it is so tall that it cannot be suspended freely in the pan from the side wall thereof. Moreover, the jar holder can be allowed to hang freely on the edge of the pan without the stabilizing effect provided by a flared edge 20 on the pan.

It is easy to stir the contents of the jar while it is being held by means of the jar holder, and when the contents of the jar are sufficiently hot the jar is easily lifted out of the pan. The jar can be inclined or turned up and down when it is held by means of the jar holder for spooning or pouring the contents into a bowl or onto a plate. When this has been done the jar is disengaged by pressing again the branches together, the jar being allowed to fall directly into a garbage can or the like. Thus, it is not necessary to touch the hot jar by hand at any moment during the handling thereof.

In a modification of the jar holder according to the invention one branch only is fixedly mounted to the handle the other branch being connected to said one branch. One branch may be pivoted to the handle or to the other branch, and there can be provided between the branches a pressure spring biasing said other branch which thus can be pressed towards said one branch against the spring bias.

I claim:

1. A container holder for handling containers having a peripheral outwardly-extending rim at an opening thereinto for retaining a cap over the opening, comprising a handle, holder means carried at one end by the handle comprising two resilient elongated planar metal strips extending outwardly from the handle at a diverging angle to each other and resiliently resisting displacement towards each other sufficiently to be in contact with each other; each strip having formed therein at a lower edge portion thereof a notch shaped for receiving an external portion of the rim at the opening of the container at circumferentially spaced locations thereof; and a serration formed along one side edge of each notch for engagement with the external portion of the rim, when the strips are displaced towards each other to move said notches towards each other and then released.

2. container holder as claimed in claim 1 wherein said strips each have two notches, the second notch being located inwardly of the first for receiving the upper edge of a pan when the container gripped by the holder is placed in the pan.

3. A container holder as claimed in claim 2 wherein the second notch forms an indentation at the inner corner thereof to receive therein an outwardly projecting edge portion of the pan.

4. A container holder as claimed in claim 1 wherein the end portions of the strips are angled outwardly at a greater divergent angle than the inner portions of the strips.

5. A jar holder comprising a handle, means carried by the handle and forming oppositely spaced notches for receiving the edge portion at the opening of the jar at circumferentially spaced locations thereon; a serration formed along one edge of each notch for engagement with the external thread of the jar, and means resiliently resisting compression of said means to move said notches towards each other, wherein said notches are formed each by one of two branches projecting from the handle, which diverge towards free ends thereof, said branches being resilient to be pressed towards each other against the bias afforded by the resiliency thereof, and wherein each branch inwardly of said notch forms a second notch for receiving the upper edge of a pan when the jar gripped by means of the jar holder is being introduced into the pan.

6. A jar holder as claimed in claim 5 wherein said second notch forms an indentation at the inner corner thereof to receive therein an outwardly projecting edge portion of the pan.

7. A jar holder as claimed in claim 5 wherein the end portions of the branches are angled outwardly.

* * * * *